United States Patent [19]
Myers

[11] 4,046,319
[45] Sept. 6, 1977

[54] ADJUSTABLE AUTO THERMOSTAT

[75] Inventor: David C. Myers, West Nyack, N.Y.

[73] Assignee: Lawrence Peska Associates, Inc., New York, N.Y. ; a part interest

[21] Appl. No.: 633,662

[22] Filed: Nov. 20, 1975

[51] Int. Cl.² .............................................. F01P 7/02
[52] U.S. Cl. ................................ 236/34.5; 236/101 C
[58] Field of Search ............... 236/34, 34.5, 93, 93 B, 236/101 C, 101 D, DIG. 1

[56] References Cited
U.S. PATENT DOCUMENTS

| | | | |
|---|---|---|---|
| 1,745,622 | 2/1930 | Jorgensen et al. | 236/34 |
| 1,950,499 | 3/1934 | Leins | 236/93 |
| 2,168,999 | 8/1939 | MacDonald | 236/34 |
| 2,750,117 | 6/1956 | Pascolini | 236/34 |
| 2,833,478 | 5/1958 | Middleton | 236/34.5 |
| 3,450,344 | 6/1969 | O'Brien | 236/93 X |

*Primary Examiner*—William E. Wayner

[57] ABSTRACT

An adjustable automotive vehicle thermostat is disclosed in which the adjusting member extends through the thermostat housing so that adjustments of the temperature response of the thermostat may be made without having to remove the thermostat from the vehicle. This allows for making adjustments for an engine to run warmer in colder climates and cooler in warmer climates without having to remove the thermostat from the vehicle.

3 Claims, 3 Drawing Figures

ADJUSTABLE AUTO THERMOSTAT

SUMMARY OF THE INVENTION

The present invention relates to a thermostat with external controls for varying the temperature sensitivity thereof. The thermostat comprises a housing member, influent and effluent members being provided in the housing for directing the flow of a fluid into and out of the housing. A valve is provided in the housing for controlling the flow of fluid through the housing. A temperature response member is operatively connected to the valve for controlling the opening and closing of the valve in response to the change of temperature of a fluid in the thermostat. The temperature response member is adjustable through an adjusting member to increase or decrease the sensitivity of the temperature response member to a change of temperature of a fluid in the thermostat. The adjusting member extends from the interior to the exterior of the thermostat so that the adjustment member may be operated externally of the thermostat housing.

DETAILED DESCRIPTION

The adjustable thermostats of the prior art suffer the disadvantage of having to be removed from the system they are inserted in to control temperature. These thermostats when used in automotive vehicles have to be taken out of the thermostat housing located in the vicinity of the water pump on the engine block is the adjustment is to be made. Thermostats of this type are disclosed in the U.S. Pat. No. 3,334,812 Bailey and U.S. Pat. No. 3,045,918 Woods.

U.S. Pat. No. 3,662,950 McIntosh et al. discloses a valve assembly that is operated by a thermostatic device and which may also be opened or closed manually. McIntosh does not disclose means for adjusting the temperature sensitivity of the thermostat and the externally controlled manually operated device that also can be used to open or close the valve is not capable of selecting any position for the valve other than an open position or a position in which the valve is engaged by the thermostat.

It is therefore an object of the present invention to overcome these and other difficulties encountered in the prior art.

It is further object of the present invention to provide a novel theremostat assembly.

It is an object of the present invention to provide a thermostat for an automotive vehicle that does not have to be changed for cooler and warmer climates or weather conditions but can be adjusted for these conditions without having to be removed from the vehicle.

These and other objects have been achieved according to the present invention and will become apparent by reference to the disclosure and claims that follow as well as the appended drawing.

Figure 1:
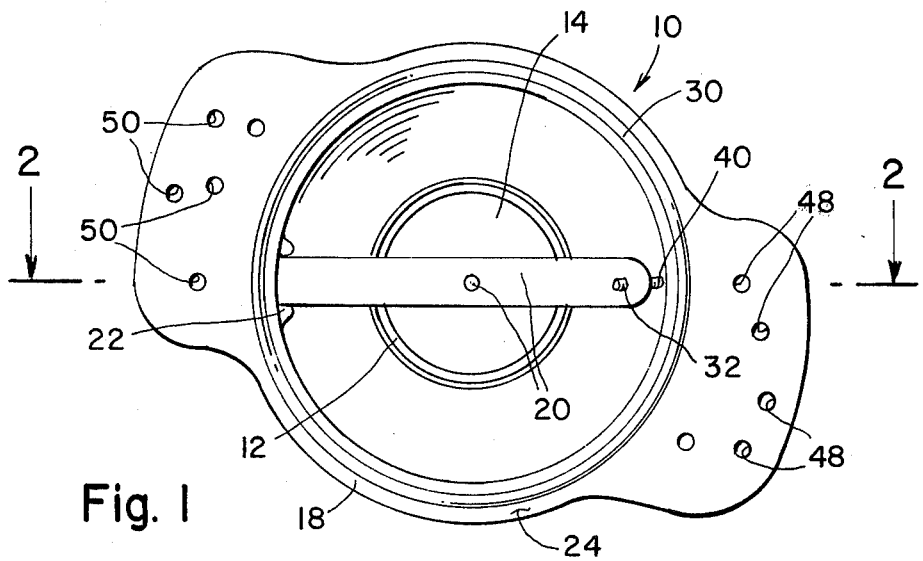
FIG. 1 illustrates a plan view of a thermostat according to one embodiment of the present invention in which the adjustment member is adjustable externally of the thermostat.
Figure 2:
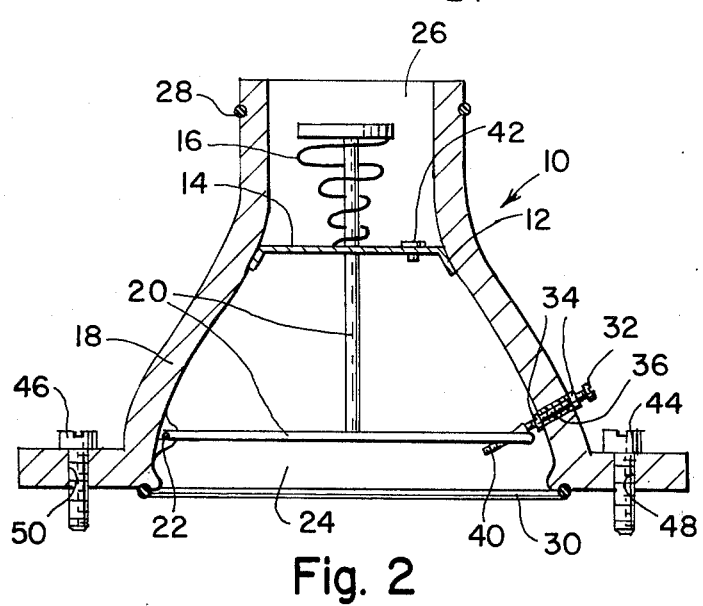
FIG. 2 illustrates a side elevation of a thermostat taken along the line 2—2 of FIG. 1.
Figure 3:
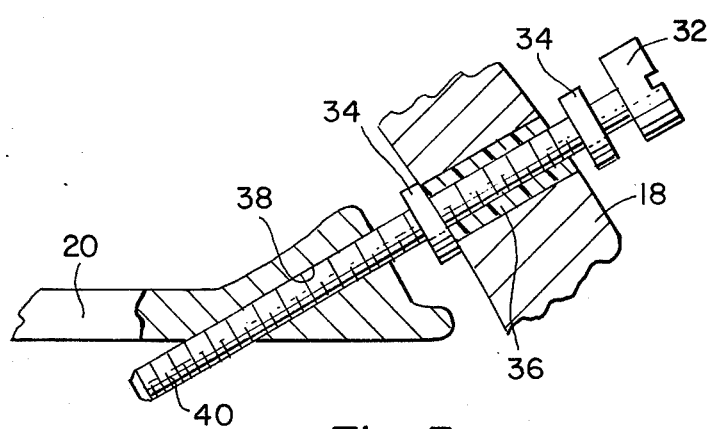
FIG. 3 illustrates a detailed view of the adjustment member which is operated externally of the thermostat housing to change the sensitivity of the thermostat to temperature of a fluid within the thermostat housing according to an embodiment of the present invention.

Referring to the drawing and FIGS. 1 through 3 a thermostat 10 is illustrated having a valve seat 12 and a valve disc 14 that engages the seat. A relief valve comprising pop valve 42 is provided in disc 14. A temperature sensitive resillient member comprising thermostatic spring 16, which may be a bi-metallic spring is provided to bias valve 14 into engagement with seat 12, the base of spring 16 being supported by adjustable support arm 20 comprising a lever type of arm pivotally connected to thermostat housing 18 through pivot 22. The housing 18 has an influent end 24 leading from an automotive engine and an effluent end 26 leading to a heat exchange device such as a radiator. A hose fitting 28 is provided at the top of housing 18 in the region of the effluent end 26 and a sealing ring, especially a tubber sealing ring 30 is provided at the base. An adjustment member 32 for changing the biasing force of spring 16 against valve 14 extends through housing 18 and is operably connected to arm 20. Housing 18 is secured to an engine block by means of bolts 44 and 46 which pass through housing 18 in holes 48 and 50, the latter being arranged so that housing 18 is universally adapted to fit substantially all automotive engine blocks.

The adjustment member 32 comprises a screw having threads 40 which engage threaded hole 38 at angle sufficient to move arm 20 when screw 32 is turned and a threaded hole in seal 36 which extends through housing 18. Seal 36 is a heat resistant material such as Teflon (trademark) or Nylon (trademark). Stops 34 on screw 32 allow screw 32 to be rotated through a range of temperature settings and may be placed according to the variations in temperature desired in the adjustable thermostat 10.

In use, the thermostat 10 is bolted to an engine block through bolts 46 and 48 so that the influent end 24 is connected to the water jacket of an engine, the effluent end 26 being connected to a heat exhanger such as a radiator. If the engine is running too hot or too cold for any climatic conditions, the adjusting screw 32 may be turned to increase or decrease the rate of flow of coolant through the thermostat 10 by the change of biasing force on the temperature sensitive spring 16.

Thus, the thermostat of the present invention uses its own water neck and does not have to be inserted in a housing. The thermostat is easily adjusted and temperature ranges are fixed by the stops on screw 32. The advantages are that the thermostat does not have to be changed for winter or summer driving and most important, an unskilled person may adjsust the auto engine temperature at any time, with a screw driver and quickly. Because the thermostat does not have to be removed, it prevents the loss of coolant occasioned when the device is replaced and eliminates the possibility of air entering a liquid coolant system during a change of the thermostat. The thermostat 10 may also be used to control the temperature of any fluid including air as well as water and the like.

Although the invention has been described by reference to some embodiments it is not intended that it be limited thereby, but that modifications thereof are intended to be included as falling within the broad scope and spirit of the foregoing disclosure, the following claims and appended drawing.

What is claimed is:

1. A thermostat with external adjusting means for varying the temperature sensitivity thereof comprising housing means, influent means and effluent means in said housing means for directing the flow of a fluid into and out of said housing means, valve means in said housing means for controlling the flow of fluid through said housing means, temperature response means operatively connected to said valve means for controlling the opening and closing of said valve means in response to a change of temperature of a fluid in said thermostat, said temperature response means comprising means that expand in response to an increase in temperature and contracts in response to a decrease in temperature, said temperature response means being arranged to bias said valve means into valve seat means mounted in said housing when fluid in said housing drops in temperature and to bias said valve means out of said valve seat means in response to an increase in temperature of fluid in said housing, adjusting means for said temperature response means to increase or decrease the sensitivity thereof to a change of temperature of a fluid in said thermostat, said adjusting means comprising shaft means passing through said housing, said shaft means operatively connected to said temperature response means, whereby adjustment of said adjusting means may be made externally of said housing, said shaft means engaging support means for supporting said temperature response means and which is adjustable through said shaft means for moving said temperature response means towards and away from said valve means, said support means comprising lever means and a first shaft member angled to intersect said lever means, secured to said lever means with said shaft member supporting said valve member and temperature response means, one end of said lever means being pivotally secured to the side of said housing, the other end of said lever means receiving said shaft means at an angle sufficient to move said lever means towards and away from said valve means when said shaft is moved in and out of said housing.

2. The thermostat of claim 1 where said shaft screwingly engages said housing through seal means mounted in said housing to block the flow of fluid from said housing around said adjustment means.

3. The apparatus of claim 1 where said thermostat comprises a necked in housing having an influent and an effluent opening, the influent and effluent opening lying on a longitudinal axis, said valve being positioned inside of said housing to move on said longitudinal axis to abuttingly and sealingly engage said necked in portion of said housing through the periphery of said valve, said housing having said lever arm pivotally secured inside of said housing adjacent the widest opening thereof said lever arm being arranged to pivotally move towards and away from said necked in portion of said housing, said first shaft member being secured to said lever arm and the other end of said shaft member passing through an opening in said valve and extending beyond said valve, temperature responsive member operatively connected to the free end of said first shaft member and said valve so that when said heat responsive member is warmed, said valve is moved along said longitudinal axis away from said necked in portion of said housing and when said heat responsive member is cooled, said valve is moved along said longitudinal axis towards the necked in portion of said housing, a second shaft member extending through said housing and engaging the free end of said lever at an angle sufficient so that when said second shaft is moved towards and away from said housing, the periphery of said valve is moved towards or away from the necked in portion of said housing.

* * * * *

UNITED STATES PATENT AND TRADEMARK OFFICE
CERTIFICATE OF CORRECTION

PATENT NO. : 4,046,319
DATED : September 6, 1977
INVENTOR(S) : David C. Myers

It is certified that error appears in the above—identified patent and that said Letters Patent is hereby corrected as shown below:

On the Title Page, item 75, the inventor's address should read -- Hammond, Ind. 46320 --.

Signed and Sealed this

Eleventh Day of November 1980

[SEAL]

Attest:

SIDNEY A. DIAMOND

Attesting Officer     Commissioner of Patents and Trademarks